June 10, 1930.  J. S. HEBREW  1,763,150
REACTOR SYSTEM
Filed July 15, 1927   2 Sheets-Sheet 1

INVENTOR
Joseph S. Hebrew
BY
ATTORNEY

June 10, 1930.  J. S. HEBREW  1,763,150
REACTOR SYSTEM
Filed July 15, 1927   2 Sheets-Sheet 2

INVENTOR
Joseph S. Hebrew
BY
ATTORNEY

Patented June 10, 1930

1,763,150

UNITED STATES PATENT OFFICE

JOSEPH S. HEBREW, OF SHARON, PENNSYLVANIA, ASSIGNOR TO WESTINGHOUSE ELECTRIC & MANUFACTURING COMPANY, A CORPORATION OF PENNSYLVANIA

REACTOR SYSTEM

Application filed July 15, 1927. Serial No. 205,883.

My invention relates to the art of controlling or enlarging the reactance of a current-carrying conductor and has particular reference to a reactor utilizable for that purpose.

In accordance with my invention, a reactor, as aforesaid, comprises a group or stack of laminations or magnetizable members upon or about which a web of material, as tape, is wound, the structure thus formed thereafter being treated or immersed in a suitable water proofing agent; more particularly, in accordance with my invention, prior to the application of the tape, one or more members of suitable material, preferably non-magnetic in character, may be passed through and peened, or otherwise suitably clamped upon, the stack of laminations.

Further in accordance with my invention, the reactance of a conductor, as aforesaid, is controlled by inductively relating thereto a plurality of groups of magnetizable members, each of which is designed to change the reactive effect by a definite and predetermined amount.

Further in accordance with my invention, the aforesaid groups of laminations are suitably supported in position adjacent the current-carrying conductor with which they are inductively related.

My invention resides in the method of controlling the reactance of a conductor, the method of constructing a reactor, and a reactor of the character hereinafter described and claimed.

For an understanding of my methods and for an illustration of some of the forms my invention may take, reference is to be had to the accompanying drawing, in which, Figure 1 is a side elevational view of a reactor constructed in accordance with my invention.

Figure 1:
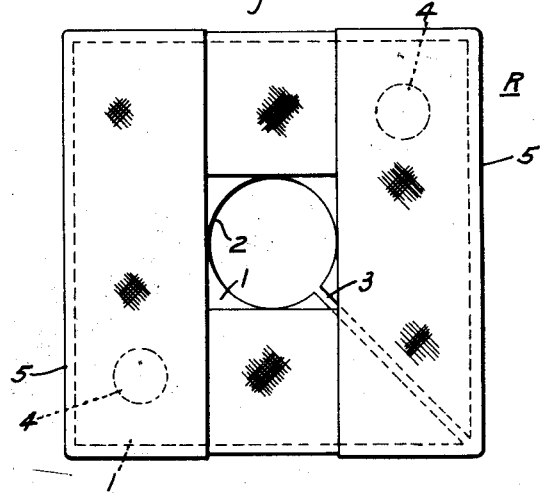
Figure 3:
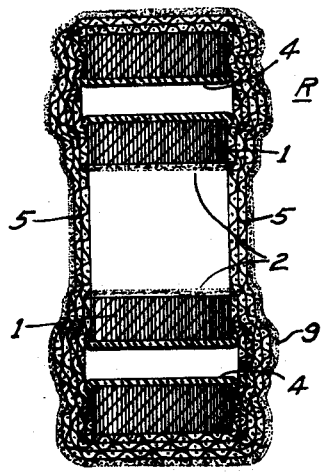
Fig. 3 is a transverse sectional view on an exaggerated scale of the structure illustrated in Fig. 1.

Referring to Figs. 1 and 3, a reactor R is illustrated as comprising a plurality of rectangular laminations or magnetizable members 1 constructed of relatively thin sheet metal, each having in the example shown, a centrally disposed perforation of relatively large diameter. When the laminations 1 are assembled or brought into stacked formation, the aforesaid perforations are alined to form a passage 2 extending through the reactor structure for the reception of a current-carrying conductor.

Ordinarily, each of the aforesaid laminations 1 is slotted, all of the slots being alined to form an air gap 3 extending, preferably, entirely through the reactor structure.

To the end that the laminations 1 may be suitably maintained in assembled relation each, in regions adjacent opposite corners thereof, may be perforated and, during the assembling operation, the perforations are brought into alinement. Thereafter, while the group of laminations are held in stacked formation, as by a clamp, members or rods 4, are passed through the respective perforations and the ends of said members 4, are peened, or otherwise suitably fastened upon the outermost laminations of the stack. Members 4 may be constructed of any suitable material; however, it is desirable that they be formed of non-magnetic material, preferably of the character known to the trade as "micarta."

Thereafter, a web 5 of suitable material as cotton tape, is disposed or wound upon or about the stack or group of laminations. By preference, as illustrated in Fig. 1, it is desirable that the web be disposed first peripherally of the laminations, then vertically, and finally horizontally.

After application of the web 5, as aforesaid, the structure should be treated with a suitable preserving agent, as a water proofing gum 9 which, to greater or less extent, passes between the individual laminations and retains them in stacked formation. Ordinarily, this treating operation is effected by immersing or dipping the taped reactor structure in the gum while the latter is heated and in a viscous or penetratable state. After the gum is cooled, it is desirable that a hard-finish varnish be applied to the reactor.

Figure 2:
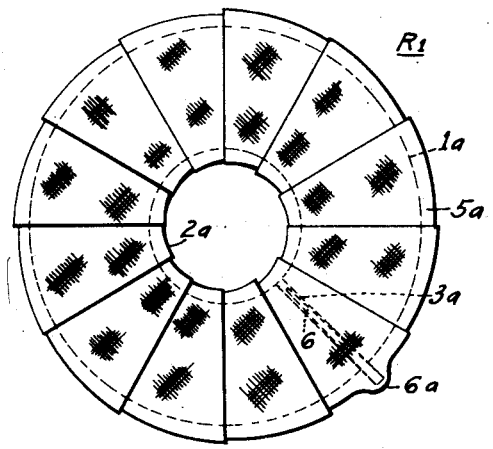
Fig. 2 is a side elevational view of a modified form of reactor.

In Figs. 1 and 3 the laminated structure is shown as generally square or rectangular. The configuration of such structure, however, may be otherwise, for example, as illustrated in Fig. 2, wherein a reactor R1 is illustrated as comprising a group of substantially circular laminations $1^a$ having an air gap $3^a$ and an opening $2^a$ centrally thereof. Ordinarily, stack-maintaining members, such as the members 4, of Fig. 3 are not utilized with the construction illustrated in Fig. 2. Hence, in order that the slots in the respective laminations $1^a$ may be maintained in alinement during the taping operation and thereafter, it is desirable that a plug or wedge 6 be inserted in the opening forming the air gap.

In the form of my invention illustrated in Fig. 2, suitable members, as fullerboard washers, not shown, may be placed exteriorly of the side laminations to prevent damage to the tape or web $5^a$ which, preferably, is wound radially of the stacked laminations, as illustrated. Otherwise, the reactor structure illustrated in Fig. 2 is constructed in a manner similar to that described above with respect to Figs. 1 and 3. That is, water proofing gum and a coating of varnish should be applied thereto in the same manner as heretofore described.

Figure 4:
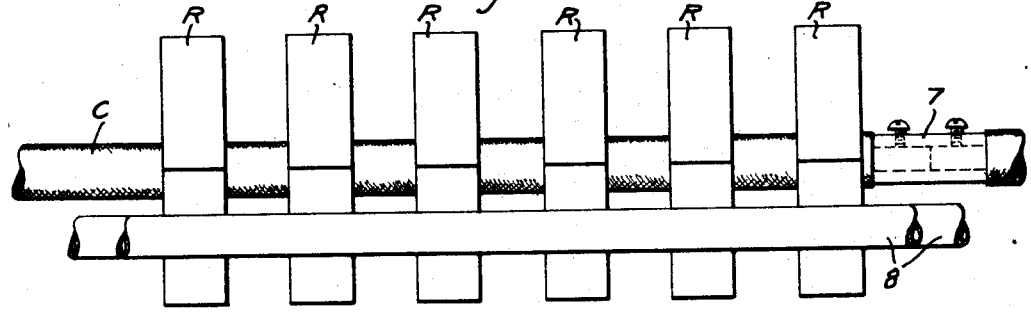
Fig. 4 is a side elevational view of a plurality of reactors associated with a current-carrying conductor, and, Fig. 5 is a transverse vertical sectional view of the arrangement illustrated in Fig. 4.
Figure 5:
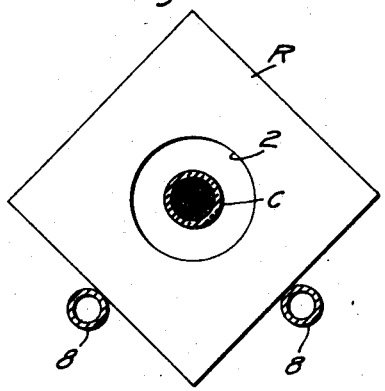

Referring to Fig. 4, a plurality of reactors are illustrated as inductively related to a current-carrying conductor C which, under certain circumstances, may be a transformer lead. When the reactors are provided with a centrally disposed perforation, as is usually the case, a suitable connector 7 may be removed to expose an end of said conductor C which thereupon may be passed through any desired number of the reactors R or R1. The latter may be spaced in any desired relation thereby providing ventilating passages and are disposed upon a supporting structure of any suitable character which, in the example illustrated, comprises a plurality of members or pipes 8.

It is desirable that the reactors R or R1 be placed on the supporting structure 8 with the air gaps of the respective reactors in alinement. With a reactor structure of the character illustrated in Fig. 1, where the air gap 3 extends to one corner of the reactor, all of the corners comprising air gaps may be readily placed in alinement. With a reactor structure such as illustrated in Fig. 2 for alinement purposes, the members 6 may extend beyond the periphery of the stack of laminations to thereby produce a hump or projection $6^a$ in the taped structure.

A system of the character illustrated in Fig. 4 is especially suitable for meeting changes in reactance necessitated by changing load conditions. The thickness of the various groups of laminations may be of the order of two inches, more or less, and, therefore, in order to increase the reactance of the current-carrying conductor by a relatively large amount, a number of the reactors are utilized. For subsequent slight charges in reactance, either more or less, one or more of the reactors may be either added or removed from said conductor. Thus, there is provided an extremely flexible system for changing the reactance of the current-carrying conductor.

It shall be understood that in lieu of a single conductor C there may be provided a plurality of conductors corresponding therewith all of which, however, are comprised in a single circuit system. This arrangement is described in Hebrew and Ross application Serial No. 29,287, filed May 11, 1925. Furthermore, as described in said application, one or more of the reactors illustrated herein may be utilized as a balancing structure to equalize the currents delivered by parallel-conducted secondary windings of a transformer bank.

I claim as my invention:

1. A reactor comprising a group of magnetizable members, a member comprising a phenol condensation product passing through said magnetizable members, a web of tape disposed about said magnetizable members for holding them in assembled relation, and water-proof gum material disposed on said tape.

2. The combination with a current-carrying conductor, of spaced groups of magnetizable members of a magnetic circuit through which said conductor passes, and means for supporting said groups of magnetizable members out of engagement with said conductor.

In testimony whereof, I have hereunto subscribed my name this 7th day of July, 1927.

JOSEPH S. HEBREW.